(12) United States Patent
Flickinger et al.

(10) Patent No.: US 12,307,245 B2
(45) Date of Patent: May 20, 2025

(54) VERSION CHANGE SYSTEMS AND METHODS APPLIED TO INDUSTRIAL AUTOMATION SYSTEMS

(71) Applicant: Rockwell Automation Technologies, Inc., Mayfield Heights, OH (US)

(72) Inventors: Peter J. Flickinger, Oak Creek, WI (US); Andrew T. Dudley, Whitewater, WI (US); Brandon Uniewski, Greenfield, WI (US); Ryan Coon, Franklin, WI (US); Andrew G. Beugnet, Milwaukee, WI (US); Todd A. Vance, West Bend, WI (US); Christian O. Vazquez-Rivera, Milwaukee, WI (US); Christopher E. Stanek, Willoughby, OH (US); Suzanne M. Michelich, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 142 days.

(21) Appl. No.: 18/107,909

(22) Filed: Feb. 9, 2023

(65) Prior Publication Data
US 2024/0272898 A1   Aug. 15, 2024

(51) Int. Cl.
*G06F 8/71* (2018.01)
(52) U.S. Cl.
CPC .................................. *G06F 8/71* (2013.01)
(58) Field of Classification Search
CPC ..................................... G06F 8/71; G06F 8/70
USPC ....................................................... 717/122
See application file for complete search history.

(56) References Cited

U.S. PATENT DOCUMENTS

| | | | |
|---|---|---|---|
| 6,832,118 B1 | 12/2004 | Heberlein et al. | |
| 7,092,771 B2 | 8/2006 | Retlich et al. | |
| 10,715,388 B2 | 7/2020 | Fildebrandt et al. | |
| 11,182,206 B2 | 11/2021 | Jung et al. | |
| 11,232,097 B1* | 1/2022 | Antao | G06F 8/41 |
| 11,455,437 B1* | 9/2022 | Kulkarni | G06F 8/71 |
| 11,474,873 B2 | 10/2022 | Biernat et al. | |
| 11,513,877 B2 | 11/2022 | Biernat et al. | |
| 2007/0136394 A1* | 6/2007 | Cowan | G06F 8/71 |
| | | | 707/999.203 |

(Continued)

FOREIGN PATENT DOCUMENTS

| | | |
|---|---|---|
| KR | 20200027783 A | 3/2020 |
| WO | 2020184362 A1 | 9/2020 |

OTHER PUBLICATIONS

Extended European Search Report for European Patent Application No. 21179775.8, dated Nov. 25, 2021, 9 pages.

(Continued)

*Primary Examiner* — Bradley A Teets
*Assistant Examiner* — Zengpu We
(74) *Attorney, Agent, or Firm* — Fletcher Yoder, P.C.

(57) ABSTRACT

Systems and methods described herein may improve configuration file generation and management in an industrial automation system. Indeed, described herein is an integrated development environment (IDE) tool that may be integrated with a version control system (VCS) to improve change control issues that may otherwise arise when multiple IT devices have access to a same project and/or configuration file.

20 Claims, 7 Drawing Sheets

(56) References Cited

U.S. PATENT DOCUMENTS

| | | | | |
|---|---|---|---|---|
| 2015/0106790 | A1* | 4/2015 | Bigwood | G06F 11/3624 |
| | | | | 717/127 |
| 2018/0024537 | A1 | 1/2018 | Chauvet et al. | |
| 2018/0054469 | A1 | 2/2018 | Simoncelli | |
| 2019/0377604 | A1 | 12/2019 | Cybulski | |
| 2020/0104171 | A1* | 4/2020 | Theimer | G06F 9/50 |
| 2020/0136906 | A1 | 4/2020 | Bernat et al. | |
| 2020/0201625 | A1* | 6/2020 | Kryzhanovsky | G06F 8/71 |
| 2020/0249928 | A1 | 8/2020 | Zeng et al. | |
| 2020/0278892 | A1 | 9/2020 | Nainar et al. | |
| 2020/0311617 | A1 | 10/2020 | Swan et al. | |
| 2021/0089354 | A1 | 3/2021 | Nixon et al. | |
| 2021/0200814 | A1 | 7/2021 | Tal et al. | |
| 2021/0218617 | A1 | 7/2021 | Palavalli et al. | |
| 2021/0312393 | A1* | 10/2021 | Stump | G06F 8/20 |
| 2021/0356949 | A1 | 11/2021 | Venne et al. | |
| 2021/0382727 | A1 | 12/2021 | Vigil et al. | |
| 2022/0027721 | A1 | 1/2022 | Thoemmes et al. | |
| 2022/0091572 | A1 | 3/2022 | Biernat et al. | |
| 2022/0391259 | A1 | 12/2022 | Biernat et al. | |
| 2023/0029262 | A1* | 1/2023 | Rose | G06F 8/71 |
| 2023/0055241 | A1* | 2/2023 | Zionpour | G06F 16/958 |

OTHER PUBLICATIONS

Partial European Search Report for European Patent Application No. 21180068.5, dated Dec. 8, 2021, 17 pages.

Marshall, "Industry 4.0: The PLC evolves from Controller to Cloud Interface," Feb. 9, 2018, https://www.rs-online.com/designspark/evolution-of-the-industrial-plcfrom-controller-to-cloud-interface, retrieved on Nov. 29, 2021, pp. 1-6.

European Search Report for European Patent Application No. 21180068.5, dated Mar. 28, 2022, 19 Pages.

Anonymous, "Pull an Image from a Private Registry", Kubernetes, retrieved on Mar. 18, 2022, 5 Pages, https://web.archive.org/web/20171003051312/https://kubernetes.io/docs/tasks/configure-pod-container/pull-image-private-registry/.

European Search Report for European Patent Application No. 21180279.8, dated Apr. 19, 2022, 12 Pages.

D. Elliott, C. Otero, M. Ridley and X. Merino, "A Cloud-Agnostic Container Orchestrator for Improving Interoperability," 2018 IEEE 11th International Conference on Cloud Computing (CLOUD), 2018, pp. 958-961, doi: 10.1109/CLOUD.2018.00145. (Year: 2018).

A. Khan, "Key Characteristics of a Container Orchestration Platform to Enable a Modern Application," in IEEE Cloud Computing, vol. 4, No. 5, pp. 42-48, Sep./Oct. 2017, doi: 10.1109/MCC.2017.4250933. (Year: 2017).

Siemens, "Siemens boosts collaboration and performance with Solid Edge 2023," https://newsroom.sw.siemens.com/en-US/solid-edge-2023/, Oct. 12, 2022.

EasyPower, "EasyPower Schedules and Elevations," https://www.easypower.com/resources/article/easypower-schedules-and-elevations, Feb. 21, 2018, 2 pages.

Eaton, "Power Distribution Monitoring and Control Campus," Jan. 2023, 4 pages.

Liu, Y. et al., "A Data-Centric Internet of Things Framework Based on Azure Cloud," IEEE Access, vol. 7, Mar. 27, 2019, 20 pages.

* cited by examiner

```
mccLineup {
        // properties
        description :=  'Lineup for IC5k testing';
        intelliCenterGuid :=  'MockLineup1a';
        shortName :=  'Mock Lineup 1A';
        isEarlyRevision :=  true;
        nameplateLine1 :=  'my Nameplate';
        nameplateLine2 :=  ' ';
        nameplateLine3 :=  ' ';
        nameplateLine4 :=  ' ';
        nameplateLine5 :=  ' ';
        nameplateLine6 :=  ' ';
        orderItemNumber :=  '0001';
        orderNumber :=  '123456';
        // documentation
        dLineup_1_dwg;
        dLineup_2_dwg;
        dLineup_3_dwg;
        mLineup_1_pdf;
        mLineup_2_pdf;
        mLineup_3_pdf;
        mLineup_4_pdf;
        // sections
        mccSection {
                // properties
                intelliCenterGuid :=  'Sec1';
                containerFamilyType :=  'MV';
                maximumSpaceFactor :=  5.0;
                title :=  'Section 1$Lfirst Uplink';
                verticalSectionNumber :=  1;
                verticalSectionOrder :=  1;
                width := 25:
                mccUnit {
                        // properties
                        descriptions :=  'PM3000 (1 SF)';
                        intelliCenterGuid :=  'Dev1';
                        bucket :=  'A';
                        catalogNumber :=  '2101A';
                        containerFamilyType :=  'LV';
                        customLoc :=  ' ';
                        displayerOrder :=  1;
                        isDual :=  true;
                        isOverlappingWireway :=  false;
```

VERSION CHANGE SYSTEMS AND METHODS APPLIED TO INDUSTRIAL AUTOMATION SYSTEMS

BACKGROUND

This disclosure relates generally to systems and methods for implementing a version change control system in an operational technology (OT) system or an industrial platform. More particularly, embodiments of the present disclosure are related to systems and methods for leveraging version control systems to synchronize edits made to OT in an information technology (IT) representation of the OT for a given industrial automation system.

Industrial automation systems are managed and operated using automation control and monitoring systems (e.g., industrial control system), particularly in industrial automation environments. Such applications may include controlling a wide range of components, such as valves, electric motors, and so forth, and the collection of data via sensors. Typical industrial control systems may include one or more components, such as programming terminals, automation controllers, input/output (I/O) modules, communication networks, human-machine interface (HMI) terminals, and the like.

With this in mind, industrial control systems may be used to control and manage operations of an operation technology (OT) system based on information technology (IT) systems. Moreover, IT systems may describe and mirror one or more devices in the OT system to represent layout of devices and better communicate statuses and control operations. Although the industrial control systems may be used to manage the operations of the devices within the OT system based on control configurations generated by software operated in the IT systems, the IT systems and software are separate from the OT systems and thus do not dynamically update per changes to the OT systems. Improved systems and methods for managing the synchronization of configuration files of the IT system with changes made to the OT network are desirable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include a processor and a memory storing a copied version of a project. The memory may also store instructions that, when executed by the processor, cause the processor to perform operations. The operations may include loading the copied version of the project from the memory. The operations may include receiving, via a graphical user interface presenting at least a portion of the project, an indication of an edit to be made to the project. The operations may also include modifying the copied version of the project based on the edit and receiving an instruction to push the modified project to a version control system. The operations may include, in response to receiving the instruction, pushing the modified project to the version control system. The operations may include receiving, from the version control system, an indication of one or more conflicting edits between on the modified project and an original version of the project stored by the version control system. The operations may include generating a visualization to present via the graphical user interface based on the indication of the one or more conflicting edits. The operations may include receiving an indication of one or more accepted edits, where the one or more accepted edits correspond to a subset of the one or more conflicting edits to modify the original version of the project. The operations may include generating a latest version of the project based on the indication of the one or more accepted edits and the modified project and pushing the latest version of the project to the version control system.

In another embodiment, a method may include loading, via a computing device, a first version of a configuration file from a memory associated with the computing device and receiving, via a graphical user interface of the computing device, an indication of an edit to be made to the configuration file. The method may include modifying, via the computing device, the configuration file stored in the memory based on the edit. The method may include receiving, via the computing device, an instruction to push the modified configuration file to a version control system, where the version control system may communicatively couple to multiple computing devices disposed in an information technology (IT) network associated with an industrial automation system. The version control system may manage edits made between different versions of configuration files by different computing devices before the edits are accessed by an industrial control system communicatively coupled to an operation technology (OT) network associated with the industrial automation system. The method may include, in response to the instruction, pushing, via the computing device, the modified configuration file to the version control system. The method may include receiving, via the computing device, an indication of one or more conflicting edits from the version control system, where the version control system may determine the one or more conflicting edits based on the modified configuration file and an original version of the modified configuration file. The method may include determining, via the computing device, a hierarchy of operation technology (OT) devices relative to the indication of the one or more conflicting edits and the modified configuration file. Furthermore, the method may include generating, via the computing device, a visualization to present via the graphical user interface based on the hierarchy of OT devices, the one or more conflicting edits, and the modified configuration file.

In yet another embodiment, a non-transitory computer-readable medium may include computer-executable instructions that, when executed, may cause at least one processor to perform operations. The operations may include loading a first version of a configuration file from a memory associated with the at least one processor. The operations may include receiving an indication of an edit to be made to the configuration file via a graphical user interface. The operations may include modifying the configuration file stored in the memory based on the edit. The operations may include receiving an instruction to transmit the modified configuration file to a version control system, where the version control system may communicatively couple to multiple computing devices disposed in an information technology (IT) network associated with an industrial automation system. The version control system may manage edits made between different versions of configuration files by different computing devices before the edits are accessed by an industrial control system disposed in an operation technology (OT) network associated with the industrial automation system. The operations may include, in response to the instruction, transmitting the modified configuration file to the version control system. The operations may include receiving an indication of one or more conflicting edits from the version control system, where the one or more conflicting edits indicate differences between the modified configuration file and an original version of the configuration file. The operations may include generating a visualization to present via the graphical user interface based on the indication of the one or more conflicting edits. The operations may include receiving an indication of an accepted subset of the one or more conflicting edits. Moreover, the operations may include generating a latest version of the configuration file based on the indication of the accepted subset of the one or more conflicting edits and the modified configuration file. The operations may include transmitting the latest version of the configuration file to the version control system.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein:

FIG. 4 is a diagrammatic representation of a generated template instance of the MCC configuration of FIG. 3, in accordance with an embodiment;

FIG. 5 is a diagrammatic representation of the generated template instance of the MCC configuration of FIG. 3 presented with a visualization of one or more conflicting edits made to the generated templated instance, in accordance with an embodiment;

DETAILED DESCRIPTION

Figure 1:
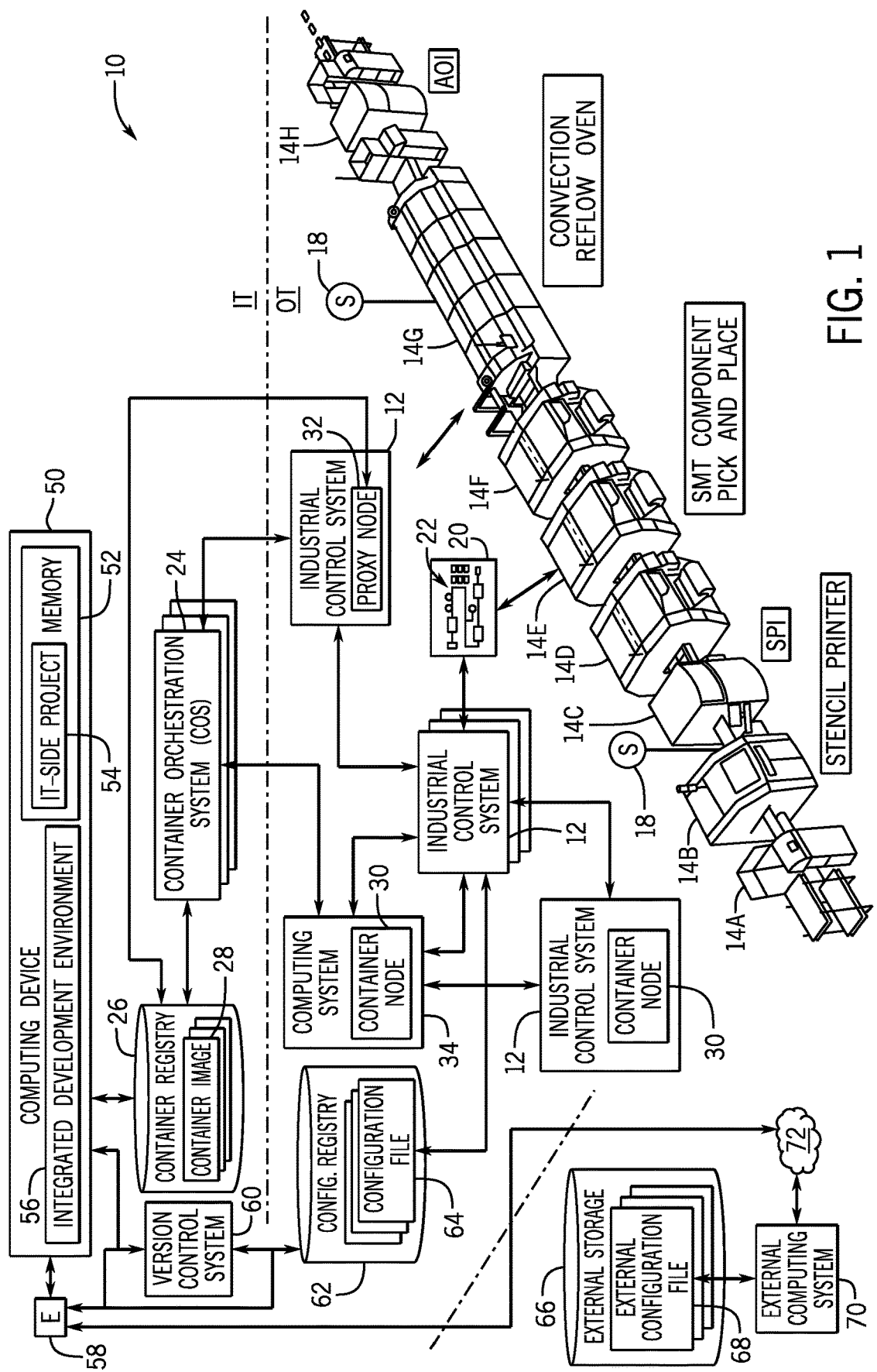
FIG. 1 is a perspective view of an example industrial automation system, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

This application is generally related to systems and methods for integrating version control systems and a configuration manager deployed at a system level (e.g., an integrated development environment (IDE) tool) in an information technology (IT) system. The systems and methods described herein may aid synchronizing changes between an operation technology (OT) system and an information technology (IT) representation of the OT system for an industrial automation system.

To elaborate, industrial automation systems may generally be divided into two categories of systems—IT systems and OT systems. Industrial control systems may be used to control and manage operations of devices that are part of the OT system. However, operators of these industrial automation systems may benefit from managing assets, such as programmable logic controllers (PLCs), that are part of the OT network using similar processes provided by information technology (IT) systems.

An industrial automation system may include a variety of OT components, such as electric motors, valves, actuators, temperature elements, pressure sensors, or a myriad of machinery or devices used for manufacturing, processing, material handling, and other applications. The industrial automation system may also include motor control centers, protection devices, switchgear, compressors, and the like. Each of these described OT components may correspond to and/or generate a variety of OT data regarding operation, status, sensor data, operational modes, alarm conditions, or the like, that may be desirable to output for analysis with information technology (IT) data from an IT network, for storage in an IT network, for analysis with expected operation set points (e.g., thresholds), or the like. In some cases, IT components may be used to generate configurations to control OT components.

With this in mind, industrial control systems may be used to control operations of the OT system based on files generated via IT systems. Moreover, a project used by IT systems may describe and mirror a device installation in the OT system. Indeed, an IT-side project may refer to a data structure that associates one or more files, datasets, or the like to describe an OT-side system arrangement and/or an OT-side component configuration to better communicate statuses, control operations, and/or arrangements of devices in the OT system.

Sometimes, one or more portions of an IT-side project may be inaccessible by one or more computing devices of the IT system once generated, such as when the IT system generates the IT-side project based on a transactional receipt (e.g., purchase order) that represents a singular configuration at a first time and not subsequent changes to the configuration at later times. The transaction-based generation methods may be undesirable when the IT-side projects and/or configuration files are used to make visualization models desired to reflect real-time arrangements and configurations of the OT system. For example, a project generated based on a purchase order file may be unchangeable since the purchase order file may be generated once without consideration for changes in the purchased system later in the future. Moreover, the IT-side project is separate from and does not dynamically update responsive to changes to the OT system (e.g., changes to the OT-side system arrangement, changes to the OT-side component configuration). Thus, it may be desirable to update the IT-side project based on changes to the physical components of the OT system. By making the content of the IT-side project editable, system arrangements and configurations represented in the IT-side project may be kept updated in real-time to mirror the OT system as actually installed. Moreover, by making the IT-side project editable, fewer computing resources may be spent regenerating an entire IT-side project each time the OT system is updated since just a portion may be updated.

Although making the IT-side project editable is desirable, change control issues may arise when multiple IT devices have access to a same IT-side project. For example, it may become complex over time to track edits made by multiple computing devices to the same IT-side project. Thus, systems and methods that improve change control operations by enabling sharing, editing, and synchronizing of IT-side projects and/or configuration files between multiple users are desired and are described below.

Indeed, these systems and methods may integrate an integrated development environment (IDE) tool with a version control system (VCS). The IDE tool may receive edits to a local project stored in local memory of an IT device. The local project may correspond to one or more devices of the OT system. The IDE tool may periodically push one or more of the edits to a main project stored in the VCS. The main project may correspond to the same one or more devices of the OT system and may represent an alternative version relative to the local project. In this way, the local project and the main project may at one time have been the same version and now, as edits may have been made to one or both projects, either the local project or the main project may be a more recent version or may have been edited more recently. After pushing the local project to the VCS, the IDE tool may receive an indication of conflicting edits between the main project and the local project. The IDE tool may summarize the conflicting edits to help reduce a complexity of change control operations and present the summarized conflicting edits as a visualization in a graphical user interface (GUI). From the GUI or from an input device, the IDE tool may receive an indication to accept one or more of the conflicting edits. The main project and the local project may be updated in memory to reflect the acceptance of the one or more conflicting edits. By doing so, edits may be made to a project locally and exported to a VCS using a relatively low-complexity change control method, thereby improving industrial automation system operations by reducing time and computing resources spent on remedying change control issues between versions of projects. Additional details with regard the change management operations and the IT-side project will be discussed below with reference to FIGS. 1-7.

By way of introduction, FIG. 1 is a perspective view of an example industrial automation system 10 controlled by one or more industrial control systems 12. The industrial automation system 10 includes stations 14 having machine components and/or machines to conduct functions within an automated process, such as silicon wafer manufacturing, as is depicted. The automated process may begin at a station 14A used for loading objects, such as substrates, into the industrial automation system 10 via a conveyor section 16. The conveyor section 16 may transport the objects to a station 14B to perform a first action, such a printing solder paste to the substrate via stenciling. As objects exit from the station 14B, the conveyor section 16 may transport the objects to a station 14C for solder paste inspection (SPI) to inspect printer results, to a station 14D, 14E, and 14F for surface mount technology (SMT) component placement, to a station 14G for convection reflow oven to melt the solder to make electrical couplings, and finally to a station 14H for automated optical inspection (AOI) to inspect the object manufactured (e.g., the manufactured printed circuit board). After the objects proceed through the various stations, the objects may be removed from the station 14H, for example, for storage in a warehouse or for shipment. Clearly, for other applications, the particular system, machine components machines, stations, and/or conveyors may be different or specially adapted to the application.

For example, the industrial automation system 10 may include machinery to perform various operations in a compressor station, an oil refinery, a batch operation for making food items, chemical processing operations, brewery operations, mining operations, a mechanized assembly line, and so forth. Accordingly, the industrial automation system 10 may include a variety of operational components, such as electric motors, valves, actuators, temperature elements, pressure sensors, or a myriad of machinery or devices used for manufacturing, processing, material handling, and other applications. The industrial automation system 10 may also include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like. Each of these described operational components may correspond to and/or generate a variety of operational technology (OT) data regarding operation, status, sensor data, operational modes, alarm conditions, or the like, that may be desirable to output for analysis with IT data from an IT network, for storage in an IT network, for analysis with expected operation set points (e.g., thresholds), or the like.

In certain embodiments, one or more properties of the industrial automation system 10 equipment, such as the stations 14, may be monitored and controlled by the industrial control systems 12 for regulating control variables. For example, sensing devices (e.g., sensors 18) may monitor various properties of the industrial automation system 10 and may be used by the industrial control systems 12 at least in part in adjusting operations of the industrial automation system 10 (e.g., as part of a control loop). In some cases, the industrial automation system 10 may be associated with devices used by other equipment. For instance, scanners, gauges, valves, flow meters, and the like may be disposed on or within the industrial automation system 10. Here, the industrial control systems 12 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control systems 12 may be communicatively coupled to a display/operator interface 20 (e.g., a human-machine interface (HMI)) and to devices of the industrial automation system 10. It should be understood that any suitable number of industrial control systems 12 may be used in a particular industrial automation system 10 embodiment. The industrial control systems 12 may facilitate representing components of the industrial automation system 10 through programming objects that may be instantiated and executed to provide simulated functionality similar or identical to the actual components, as well as visualization of the components, or both, on the display/operator interface 20. The programming objects may include code and/or instructions stored in the industrial control systems 12 and executed by processing circuitry of the industrial control systems 12. The processing circuitry may communicate with memory circuitry to permit the storage of the component visualizations.

As illustrated, a display/operator interface 20 depicts representations 22 of the components of the industrial automation system 10. The industrial control system 12 may use data transmitted by sensors 18 to update visualizations of the components via changing one or more statuses, states, and/or indications of current operations of the components. These sensors 18 may be any suitable device adapted to provide information regarding process conditions. Indeed, the sensors 18 may be used in a process loop (e.g., control loop) that may be monitored and controlled by the industrial control system 12. As such, a process loop may be activated based on process inputs (e.g., an input from the sensor 18) or direct input from a person via the display/operator interface 20. The person operating and/or monitoring the industrial automation system 10 may reference the display/operator interface 20 to determine various statuses, states, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

The industrial automation system 10 may be considered a data-rich environment with several processes and operations that each respectively generate a variety of data. For example, the industrial automation system 10 may be associated with material data (e.g., data corresponding to substrate or raw material properties or characteristics), parametric data (e.g., data corresponding to machine and/or station performance, such as during operation of the industrial automation system 10), test results data (e.g., data corresponding to various quality control tests performed on a final or intermediate product of the industrial automation system 10), or the like, that may be organized and sorted as OT data. In addition, sensors 18 may gather OT data indicative of one or more operations of the industrial automation system 10 or the industrial control system 12. In this way, the OT data may be analog data or digital data indicative of measurements, statuses, alarms, or the like associated with operation of the industrial automation system 10 or the industrial control system 12.

The industrial control systems 12 described above may operate in an OT space in which OT data is used to monitor and control OT assets, such as the equipment illustrated in the stations 14 of the industrial automation system 10 or other industrial equipment. The OT space, environment, or network generally includes direct monitoring and control operations that are coordinated by the industrial control system 12 and a corresponding OT asset. For example, a programmable logic controller (PLC) may operate in the OT network to control operations of an OT asset (e.g., drive, motor). For example, the OT space may involve communications that are formatted according to OT communication protocols, such as FactoryTalk Live Data, EtherNet/IP. Common Industrial Protocol (CIP), OPC Direct Access (e.g., machine to machine communication protocol for industrial automation developed by the OPC Foundation), or any suitable OT communication protocol (e.g. DNP3, Modbus, Profibus, LonWorks, DALI, BACnet, KNX, EnOcean). The industrial control systems 12 may be specifically programmed or configured to communicate directly with the respective OT assets.

A container orchestration system 24, on the other hand, may operate in an information technology (IT) environment. That is, the container orchestration system 24 may include a cluster of multiple computing devices that coordinates an automatic process of managing or scheduling work of individual containers for applications within the computing devices of the cluster. In other words, the container orchestration system 24 may be used to automate various tasks at scale across multiple computing devices. By way of example, the container orchestration system 24 may automate tasks such as configuring and scheduling of containers, provisioning and deployments of containers, determining availability of containers, performing load balancing, and the like. It should be noted that containers refer to technology for packaging an application along with its runtime dependencies. That is, containers include applications that are decoupled from an underlying host infrastructure (e.g., operating system). By including the run time dependencies with the container, the container may perform in the same manner regardless of the host in which it is operating. In some embodiments, containers may be stored in a container registry 26 as container images 28. The container registry 26 may be any suitable data storage or database that may be accessible to the container orchestration system 24. The container image 28 may correspond to an executable software package that includes the tools and data employed to execute a respective application. That is, the container image 28 may include related code for operating the application, application libraries, system libraries, runtime tools, default values for various settings, and the like.

In some systems, the container orchestration system 24 may include a cluster of computing devices, computing systems, or container nodes that may work together to achieve certain specifications or states, as designated in the respective container. In some embodiments, container nodes 30 may be integrated within industrial control systems 12 as shown in FIG. 1. That is, container nodes 30 may be implemented by the industrial control systems 12 in a computing system 34, such that they appear as worker nodes to the master node in the container orchestration system 24. In this way, the master node of the container orchestration system 24 may send commands to the container nodes 30 that are also configured to perform applications and operations for the respective industrial equipment.

As will be described after FIG. 2, FIG. 1 also illustrates a computing device 50, a memory 52, an IT-side project 54, an integrated development environment (IDE) that supports an IDE tool (referred to herein as IDE tool 56), an edge device 58, a version control system 60, a configuration registry 62, one or more configuration files represented by configuration file 64, an external storage 66, one or more external configuration files represented by external configuration file 68, an external computing system 70, and a wireless connection 72. Additionally, interconnections are also illustrated as between one or more of these components.

Figure 2:
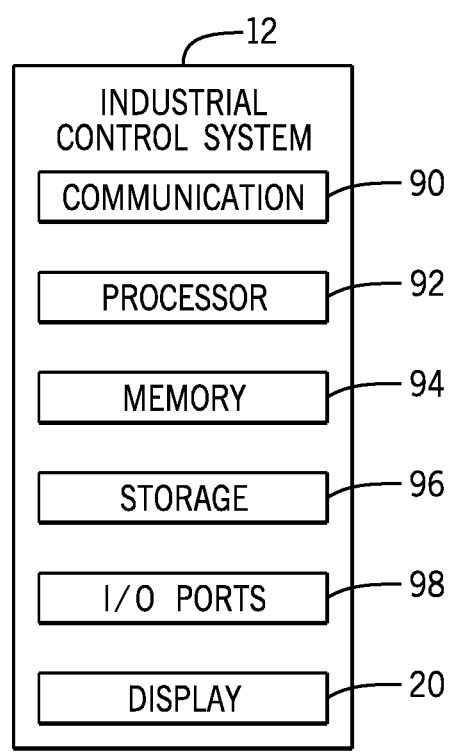
FIG. 2 is a block diagram of an example industrial control system corresponding to the example industrial automation system of FIG. 1, in accordance with an embodiment.

With the foregoing in mind, FIG. 2 is a block diagram of an example industrial control system 12 that may be used with the embodiments described herein. Although FIG. 2 is discussed with reference to the industrial control system 12, it should be understood that any of the computing devices discussed herein may have similar components to perform operations. The industrial control system 12 may include a communication component 90, a processor 92, a memory 94, a storage 96, input/output (I/O) ports 98, a display 20, and the like. The communication component 90 may be a wireless or wired communication component that facilitates communication between some of the IT devices and some of the OT devices. The processor 92 may be any type of computer processor or microprocessor capable of executing computer-executable code. The processor 92 may also include multiple processors that may perform the operations described below.

The memory 94 and the storage 96 may be any suitable article of manufacture that may serve as media to store processor-executable code, data, or the like. These articles of manufacture may represent computer-readable media (i.e., any suitable form of memory or storage) that may store the processor-executable code used by the processor 92 to perform the presently disclosed techniques. The memory 94 and the storage 96 may represent non-transitory computer-readable media (e.g., any suitable form of memory or storage) that may store the processor-executable code used by the processor 92 to perform various techniques described herein. It should be noted that non-transitory merely indicates that the media is tangible and not a signal.

The I/O ports 98 may couple to one or more sensors 18, one or more input devices, one or more displays, or the like to facilitate human or machine interaction with the industrial control system 12. For example, based on a notification provided to a user via a display 20, the user may use an input device to instruct the adjustment of an OT device.

The display 20, as discussed above, may operate to depict visualizations associated with software or executable code being processed by the processor 92. In one embodiment, the display 20 may be a touch display capable of receiving inputs from a user of the industrial control system 12. The display 20 may be any suitable type of display, such as a liquid crystal display (LCD), plasma display, or an organic light emitting diode (OLED) display, for example. Additionally, in one embodiment, the display 20 may be provided in conjunction with a touch-sensitive mechanism (e.g., a touch screen) that may function as part of a control interface for the industrial control system 12.

Although FIG. 2 is depicted with respect to the industrial control system 12, it should be noted that the container orchestration system 24, the container nodes 30, and the proxy node 32, the computing device 50, the external computing system 70, and the like, may also include the same or similar components to perform, or facilitate performing, the various techniques described herein. Moreover, it should be understood that the components described with respect to FIG. 2 are exemplary figures and the industrial control system 12 and other suitable computing systems may include additional or fewer components as detailed above.

With the foregoing in mind, and now referring to FIG. 1 and FIG. 2 together, the IDE tool 56 may be used to develop an IT-side project 54. As mentioned above, the IT-side project 54 may include details regarding the arrangements and components installed in the OT system. Sometimes the IT-side project 54 includes information regarding target operational states, setpoints, component names, or other suitable metadata corresponding to one or more portions of the OT system. The IT-side project 54 may include one or more configuration files, data sets, data, metadata, and the like and may be used for a variety of purposes, including generating visualizations that represent arrangements currently deployed in an OT system and, relative to the arrangements deployed, up-to-date status indications (e.g., online, offline, stalled). After generating the IT-side project 54, the IDE tool 56 may transmit one or more portions of the IT-side project 54 (e.g., data, files, datasets) to the container registry 26 and/or a configuration registry 62.

In some embodiments, the computing device 50 may receive one or more portions of the IT-side project 54 from an external computing system 70. An edge device 58 may intercept communications between the external computing system 70 and the industrial automation system 10. For example, it may be desirable to have the flexibility to use a project and/or a configuration developed by the industrial automation system 10 (e.g., a customer industrial automation system), by a third party, by another customer industrial automation system, by a vendor that manufactured an industrial automation component, or the like. Configurations and/or projects like these may be broadly grouped into two categories (though other categories may be used), such as configurations and/or projects made by third parties or by a vendor that manufactured an industrial automation component may be considered external configuration files 68. These configuration files 64 may be brought into the IT system via the edge device 58, via direct transmission to the computing device 50, via transmission to the industrial control system 12, or the link.

In some cases, the external configuration files 68 may be validated for syntax and completeness by the OT system via the industrial control system 12 or another OT device before being saved in the configuration registry 62, memory 52, and/or accessed by an IT device. The term "3rd party" may be used to infer that a consumable format enables the external configuration file 68 to be generated by one or more sources. The consumable format of the external configuration files 68 may support validation to support integrity of configuration changes. In this way, a portion of the OT system may validate the syntax and completeness of the data of the external configuration file 68 before permitting the configuration file to be brought into the IT system.

Additional conversion operations may be performed at an edge device 58 between the external computing system 70 and a computing device 50 of the industrial automation system. The additional conversion operations may convert the external configuration file 68 from a protocol used by the external computing system 70 into a protocol used by the IT system. Indeed, the external computing system 70 may create a new (e.g. generate) or edit an existing configuration file 86 external to the industrial automation system. It is noted that the external computing system 70, the IT system, and/or the OT system (e.g., computing system 34, the industrial control system 12) may communicate between each other via wired or wireless connections, including a wireless connection 72.

A version control system (VCS) 60 may manage versions of projects and configuration files edited by different computing devices, like the computing device 50. Edits made to a configuration file by the computing device (e.g., edited relative to a version of the configuration file stored in the configuration registry 62) may undergo change control operations before being implemented in the configuration registry 62. Change control operations may include validation operations (when a permission parameter corresponding to the computing device 50 does not correspond to supervisory levels and/or editable permissions), conflicting change analysis, debugging, validation by the OT system for syntax and completeness, or the like. As will be appreciated, some of these change control operations are described further with respect to FIGS. 6-7).

As described above, some portions of the IT-side project 54 and/or configuration files 64 may have previously not been editable, such as when a system generates the IT-side project 54 based on a transactional receipt (e.g., purchase order). To enable the industrial automation system to update the IT-side projects 54 54 and/or configuration files 64 in real-time responsive to changes and/or updates to the OT system may improve an accuracy of the visualization models, among other benefits described herein. Indeed, systems and methods disclosed herein describe files of one or more IT-side projects 54 that may be edited after generation. Any suitable file and/or data may be included in the IT-side project 54. One example editable file that may be included in the one or more IT-side projects 54 is a template instance file, or an instance of a template file that includes OT system-specific data in the instance. Template and template instance files may expose a data structure and data stored within that data structure to IT devices and OT devices alike. Editing these files may reduce a complexity of maintaining the visualization models while enabling, in some cases, control circuitry of an OT system and/or IT devices to edit the visualization model by editing the underlying configuration files and/or project files.

Figure 3:
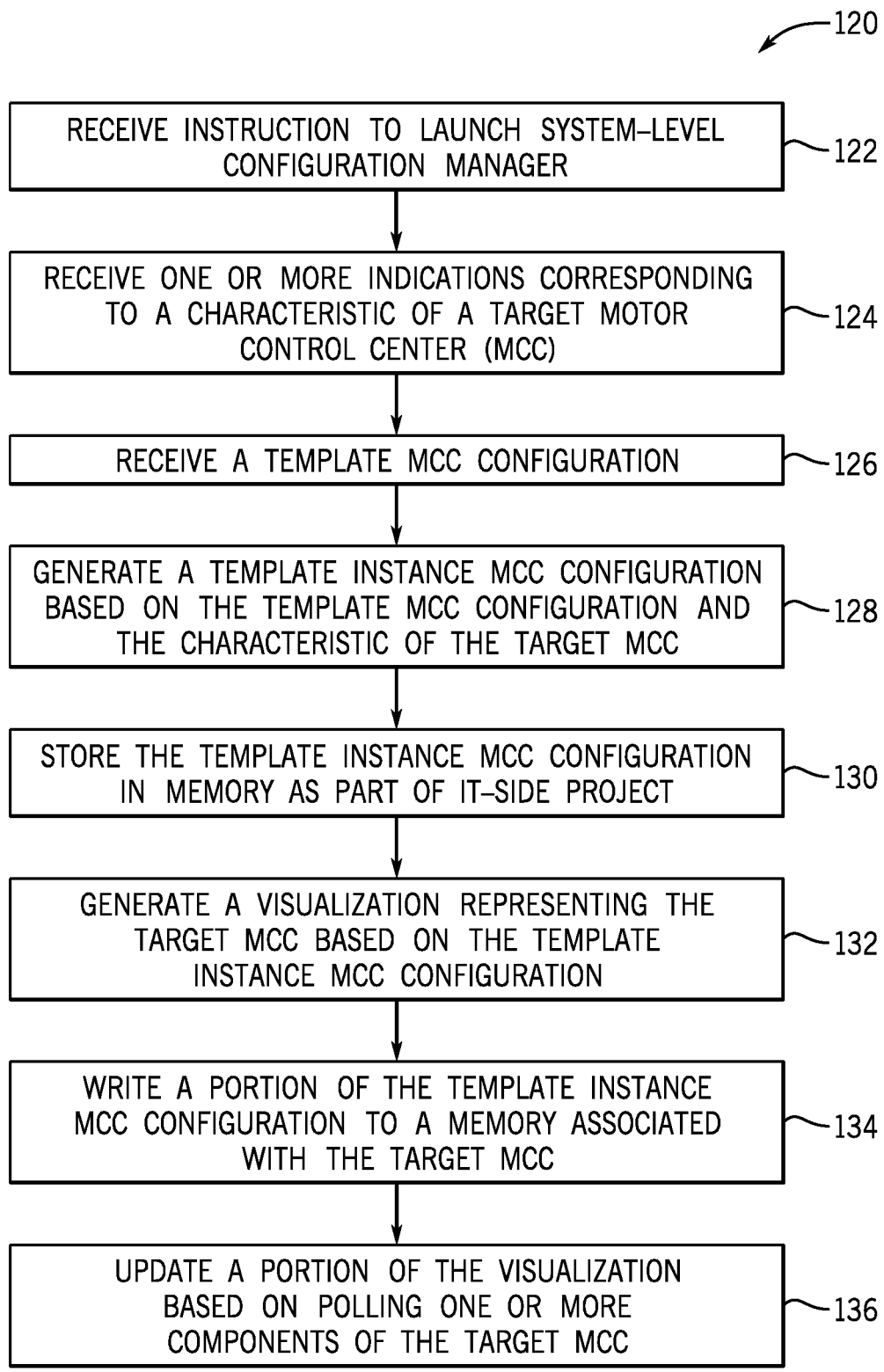
FIG. 3 is a flow diagram of a process for generating a template instance of a motor control center (MCC) configuration and updating a generated visualization based on the generated template instance, in accordance with an embodiment.

To elaborate, FIG. 3 is a flow diagram of a process 120 in which the computing device 50 may launch the IDE tool 56 and generate a template instance of a motor control center (MCC) configuration (referred to herein as the template instance MCC configuration) to add to the IT-side project 54. Although the following description of the process 120 is described as being performed by the computing device 50, it should be understood that any suitable computing device 50 may perform the operations described herein. In addition, although the process 120 is described in particular order, it should be understood that the process 120 may be performed in any suitable order.

At block 122, the computing device 50 may receive an instruction to launch the IDE tool 56. The instruction may correspond to a user input, another computing device transmitting an input, or the like. In response to receiving the instruction, the computing device 50 may launch the IDE tool 56, which causes a graphical user interface to launch.

Through the graphical user interface, at block 124, the computing device 50 may receive one or more indications corresponding to one or more characteristics of a target industrial automation components, such as a target motor control center (MCC), via the graphical user interface corresponding to the IDE tool 56. When the target industrial automation component is an MCC, these characteristics may correspond to a site-specific deployment or installation details associated with a physical installation of industrial automation control components of the MCC. The characteristics may indicate a number, type, and identity of motor control components in the MCC controlling the target motors, a voltage characteristic of the motor control components, a physical location within the OT system of the target MCC, or the like.

Continuing with the MCC example, the computing device 50, at block 126, may receive a template MCC configuration at the IDE tool 56. The computing device 50 may read the template MCC configuration in response to receiving the one or more characteristics of the target MCC. The characteristics may enable the computing device 50 to query a memory 52 (e.g., memory 94 of the IT system) to identify a suitable template MCC configuration that corresponds to the target MCC.

At block 128, the computing device 50, via the IDE tool 56, may generate a template instance MCC configuration based on the accessed template MCC configuration and the characteristics of the target MCC. The template may be a data structure by which the IDE tool 56 may receive inputs and populate automatically into without additional instruction. The template MCC configuration may similarly describe a type of device (e.g., a certain type of MCC broadly) but different devices may correspond to different template instances as the template may be respectively applied to different devices even if among the same type. In other words, each MCC may have its own template instance MCC configuration but one or more of the template instance MCC configurations may originate from a same template MCC configuration corresponding to a shared type of MCC. The computing device 50 may query existing databases and/or installed systems to identify data to associate with the target MCC in the template instance MCC configuration. In some cases, the data to describe and associate with the target MCC in the template instance MCC configuration may be obtained in association with a purchase order system output data. Obtaining the data based on a purchase order system output data may reduce computing resources since less time and resources may be expended by the computing device 50 to identify and populate the template instance MCC configuration with data.

To elaborate, FIG. 4 is a diagrammatic representation 150 of an example template instance MCC configuration. The template instance MCC configuration illustrates a parent-child relationship between components and may represent this relationship visually via nested formatting. Using template and template instances to generate device-specific or system-specific configurations may standardize access to metadata, data, and/or statuses of that device or system across the industrial automation system (e.g., since templates are share among types of devices the template instance data structure may become standardized). By doing so, fewer computing resources may be spent interpreting similar data since a time of processing may be reduced. In this example, the template instance MCC configuration includes symbols used to store data (e.g., "description :='PM30000 (1 SF)';") and at least one nested template instance (e.g., indicated by "mccSection {" and followed later by a closing indication, "}", not illustrated). When a reference is made by an industrial automation component (IT or OT system device) to the "mccLineup" template instance, reference may be made collectively to the nested data (e.g., symbol instances, any nested templates), to specific symbols, and/or to specific nested templates. Doing so may make later edits to the template instance MCC configuration less complex and standardized between each corresponding type of MCC.

Referring back to FIG. 3, once generated, at block 130, the computing device 50 via the IDE tool 56 may store the template instance MCC configuration in memory 52 of the IT system and/or the computing device 50. In some cases, the template instance MCC configuration is stored in memory 52 in association with an existing IT-side project 54 and/or stored in memory 52 to generate an IT-side project 54. By storing the template instance MCC configuration in association with an IT-side project 54, the template instance MCC configuration may be associated with any existing files or data of the IT-side project 54. This enables loading of the IT-side project 54 to also load information from the template instance MCC configuration.

A variety of system operations may be performed based on the deployment MCC configuration. For example, the computing device 50, via the IDE tool 56, may generate a visualization representing the target MCC based on the template instance MCC configuration, at block 132. The data structure of the template instance MCC configuration may correspond to different portions of a visualization. Furthermore, some systems enable the industrial control system 12 to edit the information stored in the template instances of the industrial automation system, such as by symbolic data access operations. By associating the visualization presented via the graphical user interface to data of the template instance MCC configuration, the visualization may be kept up-to-date relative to changes in the OT system despite the IT system being separate from the OT system.

In some cases, the configuration may be written to an OT device directly and/or to memory associated with the OT device via firmware. For example, at block 134, one or more portions of the template instance MCC configuration may be written to a memory corresponding to the MCC or components of the MCC. For example, particular set points represented in the template instance MCC configuration may be written to a controller used to implement control actions associated with the operation of the target MCC based on the set points. As one example, at block 136 the computing device 50, via the IDE tool 56, may update the visualization based on a change in value of the template instance MCC configuration. The visualization may update based on arrangements, sensed data, and/or reported statuses of one or more components of the OT system. When updating the visualization and other processes based on the template instance MCC configuration, these processes may be updated in real-time to mirror new installations and/or current operating conditions.

Figure 5:
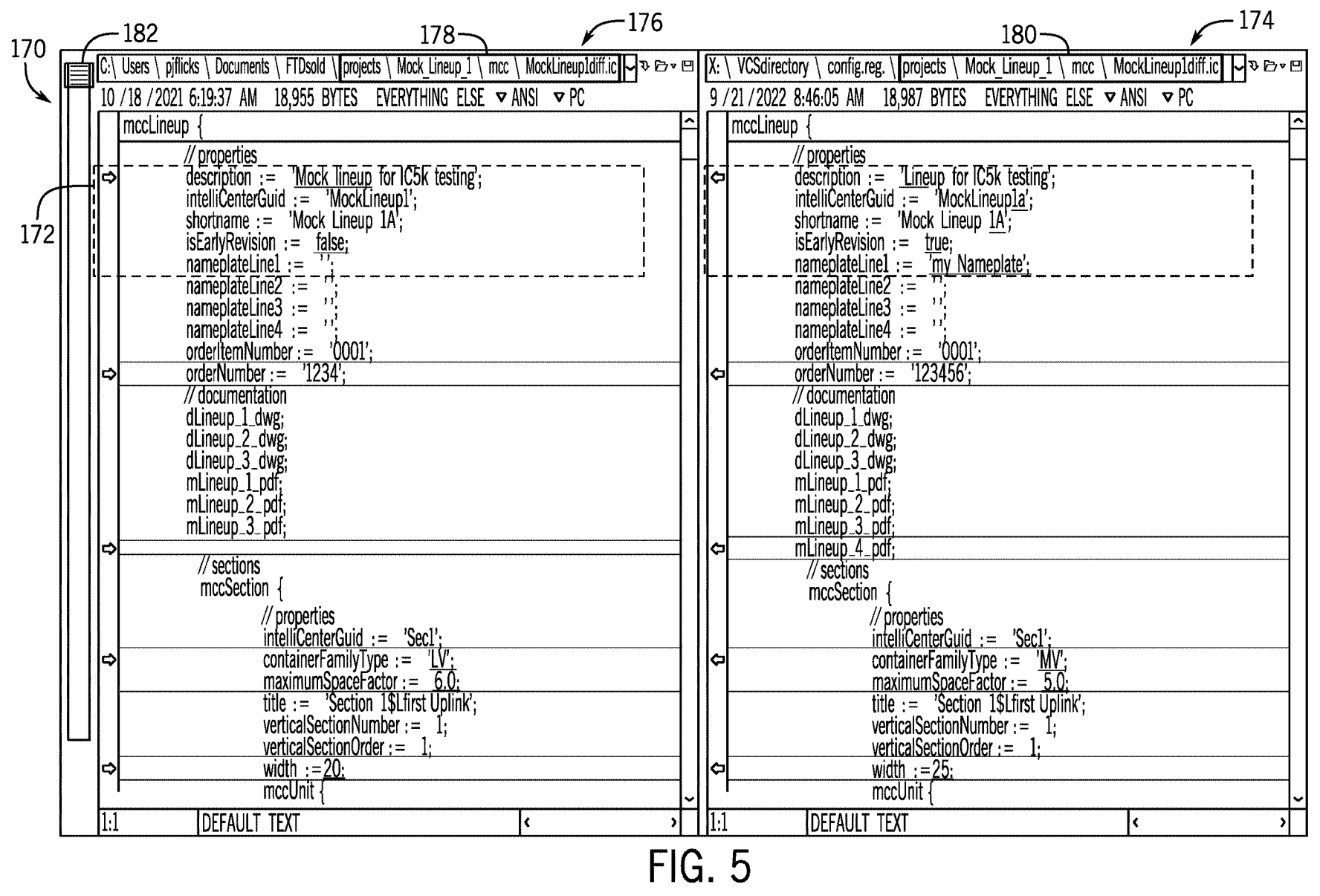

In some cases, one or more computing devices 50 may want to modify the template instance MCC configuration of the IT-side project 54 a later time. FIG. 5 is a diagrammatic representation 170 of the template instance MCC configuration of FIG. 3 presented via a graphical user interface. When one computing device 50 modifies the template instance MCC configuration, provided the computing device 50 has suitable permissions, the edits may be implemented without undesired delay. However, when more than one computing device 50 modifies the template instance MCC configuration, change conflicts may arise when a first computing device 50 made a conflicting edit to an edit made by as a second computing device 50.

The graphical user interface presents an example of one or more conflicting edits 172 made to the template instance MCC configuration (e.g., original version corresponding to a reference arrow 174) within an edited template instance MCC configuration (e.g., newer version corresponding to a reference arrow 176). File directory indication 178 and file directory indication 180 illustrate how the visualizations of the template instance MCC configurations are associated in different memories (e.g., "user" vs "VCSdirectory") with a same IT-side project 54 (e.g., "projects") despite including different information in the different versions of the files. The graphical user interface illustrates a line-by-line comparison performed by the computing device 50. In some cases, multiple computing device 50 may edit a template instance MCC configuration. These edits may occur simultaneously or asynchronously. Before the edits are fully incorporated in the template instance MCC configuration, the edits may be subject to conflicting change analysis to verify whether one or more current edits to the template instance MCC configuration conflict with one or more other edits made by another computing device 50. For example, the subset of conflicting edits shown via the graphical user interface may correspond to conflicting edits. The GUI may also include navigational buttons (e.g., reference arrow 182) to aid navigation of the interface and file. In any case, this representation of the conflicting edits to the template instance MCC configuration may be complex to interpret and thus use relatively higher amounts of computing resources to be spent interpreting and preparing results. Furthermore, since each conflicting edit is represented, there may be no indication of types of edits or a summary of edits made to aid in processing.

Thus, it may be desired to integrate a version control management system (VCS) into the system-level configuration manager to enable editing, sharing, and synchronizing configuration content of the template instance MCC configuration and/or the IT-side project in a manner that aids standardization of change processing. Indeed, once conflicting edits are identified, the system-level configuration manager may present a summary of edits via a graphical user interface of the computing device. The presented summary of the edits may be made based on the underlying deployment MCC configuration to tailor presented subset of the edits to the underlying system affected. Thus, the VCS 60, the resulting summary of edits, or both may make evaluating the edits less complex, which may reduce consumption of computing resources to deploy the edits and may reduce a likelihood of discrepancy occurring between documentation and/or depending operations corresponding to the IT system and the OT system.

Figure 6:
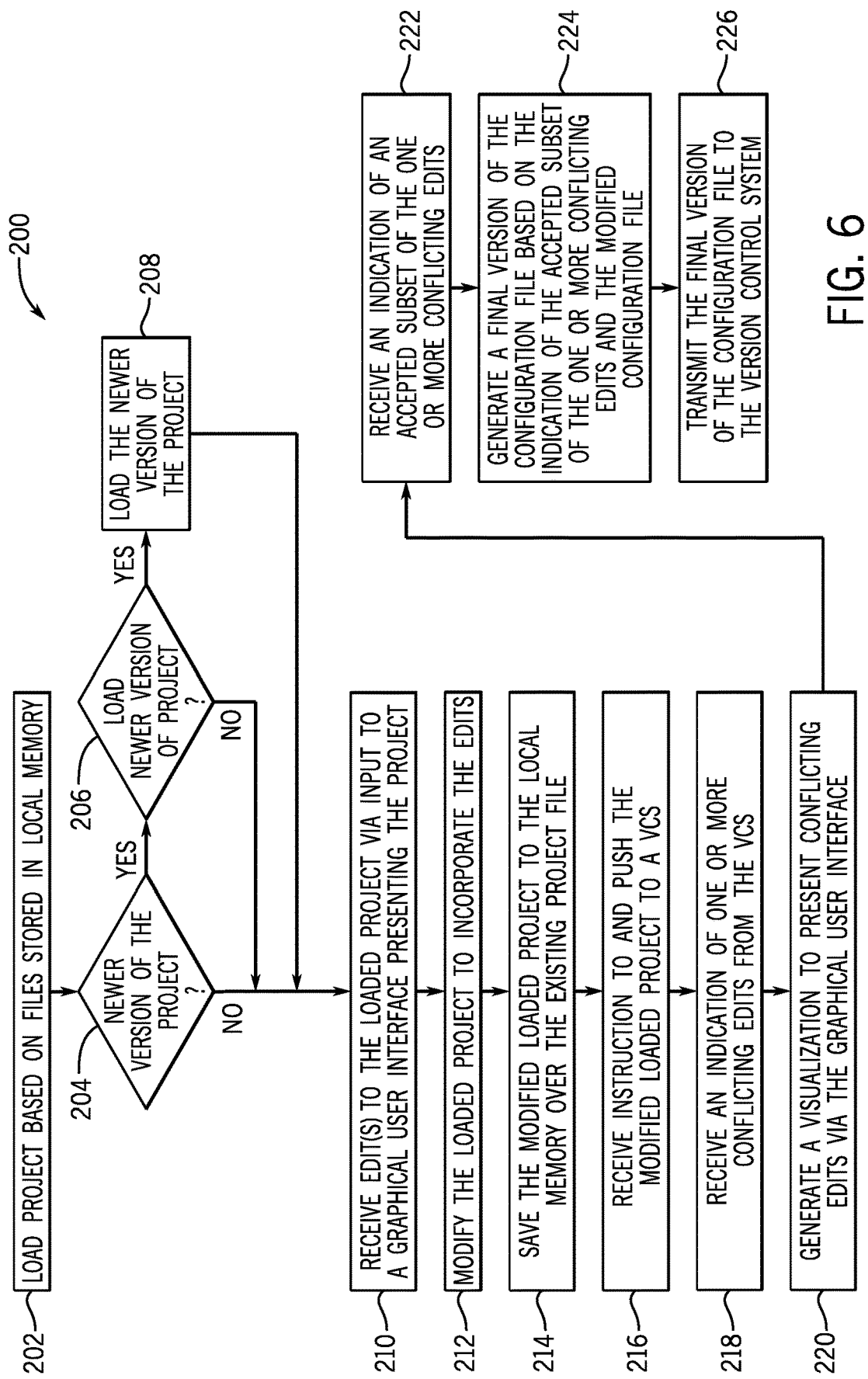
FIG. 6 are a flow diagram of a process for operating an integrated development environment (IDE) tool to manage changes to an IT-side project associated with the template instance of the MCC configuration of FIG. 3, in accordance with an embodiment.

To elaborate, FIG. 6 is a flow diagram of a method 200 in which the computing device 50 may launch the IDE tool 56 with integrated VCS 60 operations to generate a template instance MCC configuration to add to an IT-side project 54. Although the following description of the method 200 is described as being performed by the computing device 50, it should be understood that any suitable computing device 50 may perform the operations described herein. In addition, although the method 200 is described in particular order, it should be understood that the method 200 may be performed in any suitable order.

At block 202, the computing device 50 may load the IT-side project 54 based on files stored in the memory 52. The computing device 50 may do so in response to an instruction that specifies to load that IT-side project 54 from one or more projects in the memory 52. To do so, the computing device 50 may launch an IDE tool 56 within the IDE. A processor of the computing device 50 may load the IT-side project 54 from the memory 52 in response to receiving an instruction from the industrial control system 12 communicatively coupled to the operation technology (OT) network associated with the industrial automation system 10, where the industrial control system 12 may generate the instruction in response to detecting a change to a component communicatively coupled to the OT network that is affected by the edit. In this way, the industrial control system 12 may cause an update to the IT-side project 54 based on the change to the component of the OT network that is to be reflected in an edit to the IT-side project 54.

When loading the IT-side project 54, the computing device 50 may update a presented GUI based on the one or more files associated with the IT-side project 54. The IT-side project 54 may be associated with one or more template instance configuration files, where at least one of the template instance configuration files are associated with a processing operation to be performed on operational technology (OT) data associated with one or more industrial automation devices of the industrial automation system. In this way, the computing device 50 may use data of the template instance configuration files (e.g., data stored in association with symbols and/or symbol instances) to update one or more visualizations of the GUI.

At block 204, the computing device 50 may determine whether there is a newer version of the IT-side project 54 stored in the VCS 60. The computing device 50 may make this determination in response to a user input to the GUI and/or as part of a set of operations performed when the IT-side project 54 is loaded from the memory 52. The VCS 60 may maintain an indication of a version and/or a last modified data associated with the master copy of the IT-side project 54 stored in the VCS 60.

When the computing device 50 determines that a newer version (e.g., most recent version) of the IT-side project 54 is stored in the VCS 60, at block 206, the computing device 50 may generate a notification to ask an operator (e.g., user of the computing device 50) whether to load the newer version of the IT-side project 54. The notification may present a visualization that includes a digital button via which the GUI may accept an input from an input device indicating to load or to not load the newer version of the IT-side project 54 from the VCS 60.

In response to a first input, at block 208, the computing device 50 may load the newer version of the IT-side project 54 (e.g., master copy) from the VCS 60. This may involve reading (e.g., downloading) one or more files associated with the newer IT-side project 54 from the VCS 60 and writing the files into local memory 52. Writing the files associated with the newer IT-side project 54 to the memory 52 may overwrite the one or more files associated with the IT-side project 54 (e.g., older version locally stored) in response to an input received via the computing device 50, such as a user input. In some cases, the computing device 50 may automatically update the version stored in the memory 52 to the most recent version stored in the VCS 60. Furthermore, in some cases, the computing device 50 may receive one or more files associated with the IT-side project 54 from an external computing device 50 and may load the IT-side project 54 based at least in part on these externally sourced files.

After loading the newer version of the project at block 208 and/or receiving an instruction to not load the newer version, at block 206, the computing device 50 may, at block 210, receive one or more indications of edits to the loaded project via one or more inputs. The inputs may correspond to one or more audio inputs, visual inputs, signals via an input device, or the like.

At block 212, the computing device 50 may modify the loaded project based on the edits to incorporate the edits into a presented visualization and, at block 214, may store the modified IT-side project 54 over the corresponding files stored in the memory 52. The edits may indicate to the computing device 50 what edits are to be made to the presented visualization and the computing device 50 may extrapolate what edits are to be made in the corresponding files based on the edits to the presented visualizations. This storage operation may update a stored version of the IT-side project 54 to the modified IT-side project 54.

In some cases, the computing device 50 may proceed without additional input to push the modified IT-side project 54 to be stored in the VCS 60. However, sometimes it is desired that project files of the modified IT-side project 54 are worked on for a period of time locally without automatic back-up in the VCS 60. In these cases, the computing device 50 may await instruction to proceed.

Indeed, at block 216, the computing device 50 may receive an instruction to push the modified IT-side project 54 to be stored in the VCS 60 and may push the modified IT-side project 54 to the VCS 60. The VCS 60 may receive the modified IT-side project 54 and may determine one or more edits made between the modified IT-side project 54, other modified versions of the IT-side project (e.g., versions or edits in quarantine while waiting to be validated by a computing device with suitable permissions), the master copy of the IT-side project 54 stored in the VCS 60, or any combination thereof. Edits that do not conflict may be accepted into the master copy of the IT-side project 54 and/or the version of the IT-side project 54 in quarantine waiting to be validated. Edits that do conflict are not incorporated before the computing device 50 resolves the conflict and, to facilitate in this, the VCS 60 may push an indication of the conflicting edits to the computing device 50.

At block 218, the computing device 50 may receive an indication of one or more conflicting edits from the VCS 60. And, at block 220, the computing device 50 may generate one or more visualizations to present the one or more conflicting edits via the GUI. In doing so, the computing device 50 may an indication of commonalities among the one or more conflicting edits from the VCS 60 and/or may determine one or more commonalities among the one or more conflicting edits. The commonalties may be relative to parameters being edits (e.g., name, description, metadata) or other suitable data of project files. The computing device 50 may determine a subset of the one or more conflicting edits based on the one or more conflicting edits and the commonalities between the one or more conflicting edits. In this way, the subset of conflicting edits may be then presented, as part of the visualization, by the computing device 50 to summarize the edits among the different versions of the IT-side project 54 without presenting each of the one or more conflicting edits. An example of the visualization that summarizes the edits is shown in FIG. 7.

Figure 7:
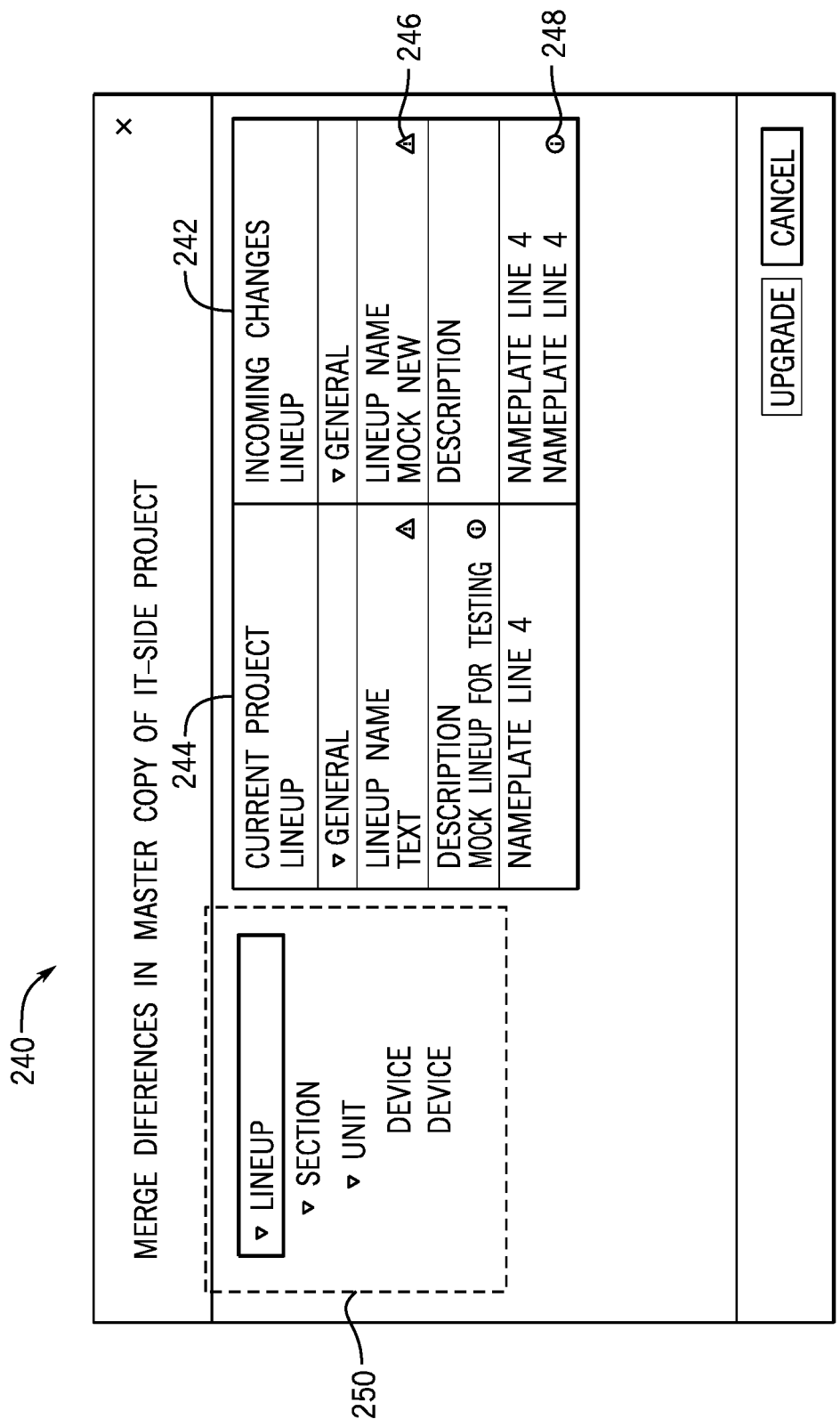
FIG. 7 is a diagrammatic representation of the generated template instance of the MCC configuration of FIG. 3 presented via an IDE tool with a visualization of a summary of conflicting edits, in accordance with an embodiment.

Referring now briefly to FIG. 7, FIG. 7 is a diagrammatic representation of a generated template instance MCC configuration presented via a graphical user interface 240 of the IDE tool 56 of FIG. 1 with a visualization 242 of a summary of conflicting edits made to the original version of the template instance MCC configuration (reference arrow 244). The VCS 60 may return the indication of the conflicting edits with additional warning indications 246 and/or information indications 248 to further communicate information about the conflicting edits. The IDE tool 56 when presenting the conflicting edits may also present a visualization 250 of the hierarchy of the template instance MCC configuration to aid an operator with viewing where in the file that the respective edits were made.

Returning to FIG. 6, at block 222, the computing device 50 may receive an indication of an accepted subset of the conflicting edits. The accepted subset may correspond to an accepted subset of the subset of the conflicting edits identified at block 218. The computing device 50 may receive one or more indications of the accept edits via one or more inputs, which may correspond to one or more audio inputs, visual inputs, signals via an input device, or the like.

At block 224, the computing device 50 may generate a final version (e.g., latest in time version) of the IT-side project 54 based on the accepted subset of the conflicting edits and the modified IT-side project 54 from block 214. The final version of the IT-side project 54 may discard one or more edits made at blocks 210 and 212 based on the other edits made to the other versions of the IT-side project 54.

At block 226, the computing device 50 may transmit the final version of the IT-side project 54 to the VCS 60. The VCS 60 may update the version of the IT-side project 54 stored in its corresponding memory to the final version of the IT-side project 54. The VCS 60 may sometimes discard the older versions of the IT-side project, which edits may be represented in the final version of the IT-side project 54.

In some cases, however, the VCS 60 may wait to push the final version of the IT-side project 54 to the VCS 60. Indeed, the VCS 60 may wait to do so until edits in the final version made by a first computing device (e.g., computing device 50) have been validated, such as confirmed as valid edits to be consumed or merged with the master copy. A user profile associated with the first computing device may be assigned one or more permission parameters based on a role of an associated operator. The VCS 60 may receive an indication of the permission parameter for that user profile from the IDE tool 56 which may indicate that the user profile is associated with the edits to the master copy of the IT-side project 54. The VCS 60 may associate the user profile to the edits. The VCS 60 may determine whether the user profile is subset to validation prior to incorporation of the edits to the master copy of the IT-side project 54. The VCS 60 may incorporate the edits without further validation if no conflicting edits arose and the edits are not subject to validation. However, if the VCS 60 determines that the edits are subject to validation based on the permission parameter of the user profile, the VCS 60 may push the edits to a second IDE tool 56 associated with a second user profile having a permission parameter permitted to validate. To push the edits to a second user profile, the VCS 60 may transmit an indication to a second IDE tool 56 corresponding to the second user profile. The second IDE tool 56 may generate a notification to present via a graphical user interface to notify an operator corresponding to the second user profile that there are unvalidated edits to be validated and pushed to the original version of the template instance MCC configuration.

In other words, in response to receiving the final version of the modified IT-side project 54, the VCS 60 may determine that a permission parameter corresponding to the system indicates that the final version of the project (e.g., IT-side project 54 transmitted at block 226) is to be validated by an additional computing device (e.g., corresponding to a suitable permission level to validate the edits). The VCS 60 may save the final version of the project separate from the original version of the project. The VCS 60 may generate an indication of one or more final edits between the final version of the project and the original version of the project. The VCS 60 may push the final version of the project and the indication of edits between the final version of the project and the original version of the project to the additional computing device. The VCS 60 may receive an indication of validation from the additional computing device and save the final version of the project over the original version of the project in response to the indication of the validation.

In some cases, the VCS 60 and the IDE tool 56 communicate via an application programming interface (API). The VCS 60 may be a program stored in memory of an IT-side device and executed by processing circuitry of the IT-side device. When executing, the VCS 60 may be accessible by other IT-side devices via a wired or wireless connection. Sometimes, an API may be used to transmit data between an IDE tool 56 and the VCS 60. The API may reformat, or convert, information (e.g., template instance MCC configuration) from one format of the IDE tool 56 to a second format used by the VCS 60. The API may do so when the IDE tool 56 is sending or receiving data with the VCS 60. The API may be associated with the IDE tool 56 to enable formatting to occur at enter or exit from the IDE tool 56.

As another example, the VCS 60 may sometimes log edits to the project files over time. The log may store indications of history of edits. The VCS 60 maintain a log of edits to the IT-side project 54 (e.g., master copy). The log of edits may enable a computing device 50 to access a history of edits to the IT-side project 54 to see what edits were made by which associated operator and at what time. In some systems, these edits histories may be accessed by the IDE tool 56, by other software executed by the computing device 50, and/or by an operator to read data included in the file. For example, the computing device 50 may use executed applications, like the IDE tool 56, to associate edits in the IT-side project 54 to changes in operations of the OT system to better evaluate which edits in the project file yielded desirable or undesirable operational changes in the OT system.

With the foregoing in mind, FIG. 6 illustrates a first example operation corresponding to receiving an indication of edits to a project file and an indication to commit (e.g., save) the edits to a master copy in the VCS 60. However, other variations of the workflow may also be used.

For example, in a second example operation, the computing device 50 may receive an indication of an instruction to pull existing edits from the VCS 60 and apply these edits to the loaded copy of the IT-side project 54 (e.g., to load a most recent version of the project). The computing device 50 may receive an indication of edits recently made to the primary copy of the VCS 60 (e.g., made within a most recent time duration). The edits may be similarly made in the local copy of the project when there are no conflicts with the loaded copy of the IT-side project 54. If there are one or more conflicting edits, an indication of the one or more conflicting edits are presented via a visualization to an operator and the computing device 50 may receive an indication of a subset of the one or more conflicting edits to be implemented into the local copy of the IT-side project 54.

In a third example workflow, the computing device 50 may have a local copy of the IT-side project 54 loaded. The IDE tool 56 may instruct the computing device 50 to poll the VCS 60 periodically (e.g., according to a period parameter) to verify whether there is an edit to the copy of the project stored in the VCS 60 that could be implemented into the local copy of the IT-side project 54. The IDS tool 56 may do so according to the period parameter and independent of an input from an input device (e.g., a user input). Should edits be identified, the computing device 50 may generate a visualization that enables an operator to accept the edits or reject one or more of the edits. Any accepted edits may be subject to a similar conflicting change analysis described earlier (e.g., blocks 218-224).

In a fourth example workflow, the computing device 50 may have a local copy of IT-side project 54 loaded. While edits are made to the local copy of the project, the computing device 50 may poll the VCS 60 to confirm whether the edits are in conflict with a most recent version of the project stored in the VCS 60. If the edits are found in conflict, the computing device 50 may generate a visualization to communicate the conflicting edits. The computing device 50 may receive an indication to proceed, at which point the conflicting edit is made to the local project for later incorporation into the VCS 60. The computing device 50 may instead receive an indication to remove the edit.

Technical effects of the systems and methods described herein include improving configuration file generation and management in an industrial automation system. As described herein, once not editable project files and/or configuration files generated based on a purchase order file may now be updated based on system-level configuration managers (e.g., integrated development environment (IDE) tool systems) and methods that implement template and template instances. By using systems and methods that generate inspectable configuration files which, upon reading, includes descriptions and structures based on an organization operational hierarchy of the industrial automation system, less complex software may be used to compare different versions of a same file. Further enhancements are described to IDE tool systems herein. Indeed, an IDE tool may be integrated with a version control system (VCS) to improve change control issues that may otherwise arise when multiple IT devices have access to a same IT-side project and/or configuration file. Thus, systems and methods that improve change control operations by enabling sharing, editing, and synchronizing of template instances between multiple users in an IT space are described herein. By doing so, edits may be made to a project locally and exported to a VCS using a relatively low-complexity change control method, thereby improving industrial automation system operations at least in part by reducing time and/or computing resources spent on remedying change control issues between versions of projects and/or configuration files.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a processor; and
a memory storing a copied version of a project and instructions that, when executed by the processor, cause the processor to perform operations comprising:
loading the copied version of the project from the memory;
receiving, via a graphical user interface presenting at least a portion of the copied version of the project, an indication of an edit to be made to the copied version of the project;
modifying the copied version of the project based on the edit;
receiving an instruction to push the modified project to a version control system;
in response to receiving the instruction, pushing the modified project to the version control system;
receiving, from the version control system, an indication of one or more conflicting edits between the modified project and a previous version of the project stored by the version control system;
generating a visualization to present via the graphical user interface based on the indication of the one or more conflicting edits;
receiving an indication of one or more accepted edits, wherein the one or more accepted edits correspond to a subset of the one or more conflicting edits to modify the previous version of the project;
generating a latest version of the project based on the indication of the one or more accepted edits and the modified project;
accessing a permission parameter stored in the memory, wherein the permission parameter indicates that the latest version of the project is to be validated by an additional computing device;
associating the latest version of the project with the permission parameter; and
pushing the latest version of the project and the permission parameter to the version control system, wherein the version control system is configured to push the latest version of the project to the additional computing device based on the permission parameter.

2. The system of claim 1, wherein the system and the version control system are communicatively coupled to an information technology (IT) network associated with an industrial automation system.

3. The system of claim 1, wherein the version control system executes on a computing device.

4. The system of claim 1, wherein the processor is configured to load the project from the memory in response to receiving a load instruction from an industrial control system communicatively coupled to an operation technology (OT) network associated with an industrial automation system, wherein the industrial control system is configured to generate the load instruction in response to detecting a change to a component communicatively coupled to the OT network that is affected by the edit.

5. The system of claim 1, wherein the processor is configured to load the project from the memory in response to receiving, via the graphical user interface, an instruction to not load a most recent version of the project stored in the memory.

6. The system of claim 1, wherein the project is associated with one or more template instance configuration files, wherein at least one of the one or more template instance configuration files are associated with a processing operation to be performed on operational technology (OT) data associated with one or more industrial automation devices of an industrial automation system.

7. The system of claim 1, wherein the processor is configured to write the project to the memory before loading the project from the memory based on one or more configuration files received from an external computing system, wherein the external computing system is disposed outside of an industrial automation system in which the system is disposed.

8. The system of claim 1, wherein the version control system is configured to:
determine that the permission parameter indicates that the latest version of the project is to be validated by the additional computing device;
save the latest version of the project separate from the previous version of the project;
generate an indication of one or more latest edits corresponding to differences between the latest version of the project and the previous version of the project;
push the latest version of the project and the indication of one or more latest edits to the additional computing device;
receive an indication of validation from the additional computing device that indicates the one or more latest edits as validated; and
save the latest version of the project over the previous version of the project to incorporate the one or more latest edits.

9. A method, comprising:
loading, via a computing device, a first version of a configuration file from a memory associated with the computing device;
receiving, via a graphical user interface of the computing device, an indication of an edit to be made to the configuration file;
modifying, via the computing device, the configuration file stored in the memory based on the edit;
receiving, via the computing device, an instruction to push the modified configuration file to a version control system, wherein the version control system is configured to communicatively couple to a plurality of computing devices disposed in an information technology (IT) network associated with an industrial automation system, and wherein the version control system is configured to manage edits made between different versions of configuration files by different computing devices before the edits are accessed by an industrial control system communicatively coupled to an operation technology (OT) network associated with the industrial automation system;
in response to the instruction, pushing, via the computing device, the modified configuration file to the version control system;
accessing, via the computing device, a permission parameter stored in the memory, wherein the permission parameter indicates that the edit is to be validated by an additional computing device;
transmitting, via the computing device, the permission parameter to the version control system in association with the modified configuration file, wherein the version control system is configured to push the edit to the additional computing device based on the permission parameter;
receiving, via the computing device, an indication of one or more conflicting edits from the version control system, wherein the version control system is configured to determine the one or more conflicting edits based on the modified configuration file and a previous version of the modified configuration file;
determining, via the computing device, a hierarchy of operation technology (OT) devices relative to the indication of the one or more conflicting edits and the modified configuration file; and
generating, via the computing device, a visualization to present via the graphical user interface based on the hierarchy of OT devices, the one or more conflicting edits, and the modified configuration file.

10. The method of claim 9, comprising:
receiving, via the computing device, an indication of one or more accepted edits, wherein the one or more accepted edits correspond to a subset of the one or more conflicting edits to modify the previous version of the configuration file;
generating, via the computing device, a latest version of the configuration file based on the indication of the one or more accepted edits and the modified configuration file; and
pushing, via the computing device, the latest version of the configuration file to the version control system.

11. The method of claim 9, comprising:
receiving, via the computing device, an indication of commonalities among the one or more conflicting edits,
determining, via the computing device, a subset of the one or more conflicting edits based on the one or more conflicting edits and the commonalities between the one or more conflicting edits; and
presenting, via the computing device, the subset of the one or more conflicting edits as part of the visualization without presenting each of the one or more conflicting edits.

12. The method of claim 9, wherein loading the first version of the configuration file from the memory comprises loading, via the computing device, a first version of a template instance corresponding to a control operation of one or more OT devices disposed in the OT network.

13. The method of claim 9, wherein loading the first version of the configuration file from the memory comprises receiving, via the computing device, the first version of the configuration file from an external computing device disposed outside of the IT network of the industrial automation system and outside of the OT network of the industrial automation system.

14. The method of claim 9, comprising:
accessing, via the computing device, a user profile indication stored in the memory, wherein the permission parameter indicates that the edit is to be validated by the additional computing device based on the user profile indication;
associating, via the computing device, the user profile indication to the edit in a log of edits performed to the modified configuration file; and
transmitting, via the computing device, the permission parameter to the version control system in association with the modified configuration file and the user profile indication.

15. A non-transitory computer-readable medium comprising computer-executable instructions that, when executed, are configured to cause at least one processor to perform operations comprising:
loading a first version of a configuration file from a memory associated with the at least one processor;

receiving an indication of an edit to be made to the configuration file via a graphical user interface;

modifying the configuration file stored in the memory based on the edit;

receiving an instruction to transmit the modified configuration file to a version control system, wherein the version control system is configured to communicatively couple to a plurality of computing devices disposed in an information technology (IT) network associated with an industrial automation system, and wherein the version control system is configured to manage edits made between different versions of configuration files by different computing devices before the edits are accessed by an industrial control system disposed in an operation technology (OT) network associated with the industrial automation system;

in response to the instruction, transmitting the modified configuration file to the version control system;

receiving an indication of one or more conflicting edits from the version control system, wherein the one or more conflicting edits indicate differences between the modified configuration file and a previous version of the configuration file;

generating a visualization to present via the graphical user interface based on the indication of the one or more conflicting edits;

receiving an indication of an accepted subset of the one or more conflicting edits;

generating a latest version of the configuration file based on the indication of the accepted subset of the one or more conflicting edits and the modified configuration file;

accessing a permission parameter stored in the memory, wherein the permission parameter indicates that the latest version of the configuration file is to be validated by an additional computing device;

associating the latest version of the configuration file with the permission parameter; and transmitting the latest version of the configuration file and the permission parameter to the version control system, wherein the version control system is configured to transmit the latest version of the configuration file to the additional computing device based on the permission parameter.

16. The non-transitory computer-readable medium of claim 15, wherein the computer-executable instructions are configured to cause the at least one processor to perform the operations comprising generating an instruction configured to cause an industrial automation control system to read the latest version of the configuration file from a configuration registry corresponding to the version control system, wherein the latest version of the configuration file comprises metadata, parameters, statuses, or any combination thereof associated with a control operation that the industrial automation control system is configured to perform.

17. The non-transitory computer-readable medium of claim 15, wherein the computer-executable instructions comprising are configured to cause the at least one processor to perform the operations comprising:

receiving an indication of commonalities among the one or more conflicting edits, determining a subset of the one or more conflicting edits based on the one or more conflicting edits and the commonalities between the one or more conflicting edits; and presenting, as part of the visualization, the subset of the one or more conflicting edits without presenting each of the one or more conflicting edits.

18. The non-transitory computer-readable medium of claim 15, wherein loading the first version of the configuration file from the memory comprises receiving the first version of the configuration file from an external computing device disposed outside of the IT network of the industrial automation system and outside of the OT network of the industrial automation system.

19. The non-transitory computer-readable medium of claim 15, wherein loading the first version of the configuration file from the memory comprises loading a first version of a template instance corresponding to a control operation of one or more OT devices disposed in the OT network of the industrial automation system.

20. The non-transitory computer-readable medium of claim 15, wherein the permission parameter is associated with a user profile.

\* \* \* \* \*